United States Patent [19]
Exner et al.

[11] 3,760,005
[45] Sept. 18, 1973

[54] CYCLIC POLYETHERS AS CATALYST ACTIVATORS IN THE ALKALICATALYZED REACTION OF ALKYLENE OXIDES

[75] Inventors: Jurgen H. Exner; David P. Sheetz; Edwin C. Steiner, all of Midland, Mich.

[73] Assignee: The Dow Chemical Company, Midland, Mich.

[22] Filed: June 2, 1971

[21] Appl. No.: 149,378

[52] U.S. Cl...... 260/615 B, 260/209 R, 260/611 A, 260/611 B, 260/612 D, 260/612 B, 260/613 R, 260/613 D, 260/613 B, 260/615 R
[51] Int. Cl............................................. C07c 41/02
[58] Field of Search ............ 260/615 B, 615, 611 B, 260/613 B

[56] References Cited
UNITED STATES PATENTS

| | | | |
|---|---|---|---|
| 2,782,240 | 2/1957 | Hefrer et al................. | 260/615 B X |
| 3,370,056 | 2/1968 | Yotsuzuka et al. ......... | 260/615 B X |
| 2,723,294 | 11/1955 | Benoit............................ | 260/615 B |
| 1,976,678 | 10/1934 | Wittwer.......................... | 260/615 B |
| 3,562,295 | 2/1971 | Pedersen........................ | 260/615 X |

FOREIGN PATENTS OR APPLICATIONS 785,229  10/1957  Great Britain..................... 260/615

*Primary Examiner*—Howard T. Mars
*Attorney*—Griswold & Burdick and C. E. Rehberg

[57] ABSTRACT

In the alkali-catalyzed reaction of an alkylene oxide with an active hydrogen compound, the rate of the reaction is increased by the presence of a cyclic polyether having at least four ether groups. Preferred polyethers are those consisting of 4–10 oxyethylene groups.

7 Claims, No Drawings

CYCLIC POLYETHERS AS CATALYST ACTIVATORS IN THE ALKALICATALYZED REACTION OF ALKYLENE OXIDES

BACKGROUND OF THE INVENTION

The reaction of an alkylene oxide with a compound having at least one active hydrogen is commonly catalyzed with alkali metal base oxyalkylation catalyst, e.g., with alkali metal hydroxide, alcoholate, phenate, etc.

Cyclic hexamer of ethylene oxide is known as are related mono- and polybenzo and cyclohexyl cyclic ethers (Pedersen, J. Am. Chem. Soc., 89, 2,495, 7,017 (1967). See also Belgian Pat. No. 743,262, Brit. Pat. No. 1,108,921 and 1,149,229 and Ger. Pat. application No. 1,963,528.

The benzo and cyclohexyl cyclic ethers disclosed by Pedersen are said to catalyze the dehydrohalogenation of aliphatic halohydrocarbons (Crary, Canadian Pat. No. 834,779).

SUMMARY OF THE INVENTION

According to the invention, the alkali-metal base catalyzed reaction of an alkylene oxide with an active hydrogen compound is accelerated by the presence of a cyclic polyether containing at least four ether groups in the ring. By "active hydrogen compound" we mean to include the alkali metal salts of such compounds, e.g., not only alcohols, phenols and amines but also the corresponding alkali metal alcoholates, phenates and amides. Suitable polyethers include all those disclosed in the above references, the disclosures of which are hereby incorporated by reference.

The cyclic ethers are those of the formula

wherein each R and R', take separately, is H, phenyl or alkyl of up to about eight carbon atoms, or R and R' in any or all of the $n$ units may be joined together to form a benzene or cycloalkane ring of 5 to 6 members, and $n$ is an integer 4 to 10.

DETAILED DESCRIPTION

The preferred polyethers are those of the above formula wherein each R is H or lower alkyl, i.e., of 1—4 carbon atoms, each R' is H and $n$ is 4–6.

The table below lists a variety of suitable polyethers, thus illustrating the scope of the invention. In the table, the tabulated elements refer to the above formula. The table shows the substituents, if any, on each of the n units in the cyclic polyether.

Other suitable polyethers include the analogs of those above wherein one or more of the fused rings bear substituents such as methyl, ethyl, butyl, phenyl, and the like, in any available positions on the rings.

Many of the suitable polyethers are known and others can be made by known methods by substitution of the appropriate analogous reactants. Known methods are shown in the references cited above, in Canadian Pat. No. 834,779, in French Pat. No. 1,440,716 and in the publications of C. J. Pedersen, J. Am. Chem. Soc., 89, 2,495 and 7,017 and 92, 386 and 391.

In practicing the process of the invention, the amount of polyether used may be varied widely. As little as 0.1 mole per mole of catalyst produces a significant increase in the rate of reaction in some instances, though larger amounts are more effective. On the other hand, when the molar ratio of polyether to catalyst substantially exceeds 1:1, a trend of diminishing effect is noted such that little improvement is achieved by ratios exceeding about 5:1, though in some instances it may be desirable to use ratios of 10:1 or more.

The alkylene oxides with which the present process may be practiced are those oxides that are polymerizable by use of alkali metal base oxyalkylation catalysts. The term "alkylene" as used herein includes those alkylene groups bearing inert substituents, such as phenyl and alkoxy groups. Thus, suitable oxides include the unsubstituted vicinal alkylene oxides, such as ethylene, propylene, 1,2- and 2,3-butylene, isobutylene and 1,2-octene oxide, styrene oxide, the glycidyl ethers, such as methyl, butyl, allyl, isopropyl, 2-methoxyethyl, 2-allyloxypropyl and phenyl glycidyl ethers and the like.

The alkali metal base oxyalkylation catalysts with which the polyethers are effective are the alkalies that effectively catalyze the polymerization of alkylene oxides. These include the alkali metal hydroxides, alkoxides, phenoxides and the like. While the Li, Cs, etc., alkalies are operable, the preferred catalysts are the Na and K alkalies because of their ready availability, low cost and effectiveness. The manner of using such catalysts is well known in the art and need not be elaborated here.

The catalyst and polyether may be dissolved in water, alcohol, glycol, phenol, or other active hydrogencontaining initiator which is to be oxyalkylated, or in the alkylene oxide to be used in the reaction, or in an added inert solvent. Among the latter are tertiary alcohols, aliphatic ethers, hydrocarbons, etc.

Examples of commonly used active hydrogenbearing initiators include the alkanols, such as methanol, ethanol, butanol, octanol, sec.-amyl alcohol and 2-octadecanol; the alkenols such as allyl alcohol, un- TABLE I.—POLYETHERS [a]

| Species | n | Unit number 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|---|
| | | R | R' | R | R' | R | R' | R | R' | R | R' | R | R' | R | R' | R | R' | R | R' | R | R' |
| 1 | 4 | H | H | H | H | H | H | H | H | | | | | | | | | | | | |
| 2 | 5 | H | Me | H | Me | H | Me | H | Me | H | Me | | | | | | | | | | |
| 3 | 6 | Me | Me | Me | Me | Me | Me | Me | Me | Me | Me | Me | Me | | | | | | | | |
| 4 | 8 | H | Et | H | Et | H | Et | H | Et | H | Et | H | Et | H | Et | H | Et | | | | |
| 5 | 6 | φ | H | φ | H | φ | H | φ | H | φ | H | φ | H | | | | | | | | |
| 6 | 4 | H | Oct | H | Oct | H | Oct | H | Oct | | | | | | | | | | | | |
| 7 | 10 | H | H | H | H | H | H | H | H | H | H | H | H | H | H | H | H | H | H | H | H |
| 8 | 6 | (Bz) | | H | H | H | H | (Bz) | | H | H | H | H | | | | | | | | |
| 9 | 4 | (Bz) | | (Bz) | | (Bz) | | (Bz) | | | | | | | | | | | | | |
| 10 | 6 | (Bz) | | H | H | (Bz) | | H | H | (Bz) | | H | H | | | | | | | | |
| 11 | 8 | (Bz) | | H | Me | H | Me | H | Me | H | Me | H | Me | H | Me | H | Me | | | | |
| 12 | 6 | (Cy-6) | | H | H | H | H | (Cy-6) | | H | H | H | H | | | | | | | | |
| 13 | 6 | (Cy-6) | | Bu | H | Bu | H | (Cy-6) | | Bu | H | Bu | H | | | | | | | | |
| 14 | 4 | (Cy-5) | | (Cy-5) | | (Cy-5) | | (Cy-5) | | | | | | | | | | | | | |
| 15 | 6 | (Cy-5) | | (Cy-5) | | (Cy-5) | | H | H | H | H | H | H | | | | | | | | |

[a] Abbreviations: Me for methyl, Et for ethyl, Oct for octyl, φ for phenyl, (Bz) for benzene (parentheses indicate that R and R' are joined together to form the indicated group), Cy-6 for cyclohexyl and Cy-5 for cyclopentyl.

decenol and 9-octadecenol, aralkanols and aralkenols, such as benzyl phenethyl and cinnamyl alcohols; glycols, such as ethylene, diethylene, tripropylene, trimethylene, 1,2- and 2,3-butylene and 1,2-octylene glycols and the higher polyethylene and polypropylene glycols having up to 100 or more alkylenoxy groups and the monoethers of such glycols and polyglycols; the higher aliphatic polyols having 3-8 hydroxyl groups, such as glycerol, pentaerythritol, sorbitol, sucrose and polyvinyl alcohol; phenols and polyphenols, such as phenol, diphenol, Bisphenol-A, phenolaldehyde condensates, etc.

SPECIFIC EMBODIMENTS

The practice of the invention is illustrated by the following examples.

The effect of the polyethers in accelerating the base-catalyzed reaction of alkylene oxide with an active hydrogen compound or alkali metal salt thereof was demonstrated by a series of experiments in which ethylene oxide (EO) or propylene oxide (PO) was reacted with the methyl monoether of triethylene glycol, using the alkali metal salt of the latter as catalyst and diglyme as the solvent. The reaction was conducted in sealed tubes at constant temperature and the extent of reaction was measured by disappearance of alkylene oxide. The rate constants were calculated and are shown in Table II.

A second series of experiments was made, similar to those of Table II except that varying concentrations of the alcohol, methyl monoether of triethylene glycol, were added to the reaction mixture. The alkylene oxide was EO. Results are shown in Table III.

TABLE III

| Example | Alkoxide Cation | Conc., M. | EO Conc., M. | Alcohol conc., M. | Cyclic polyether Type | Conc., M. | Temp., °C. | Rate const |
|---|---|---|---|---|---|---|---|---|
| 18 | Na | 0.49 | 0.47 | 0.99 | | 0 | 60 | 46.1 |
| 19 | Na | .47 | .47 | 1.00 | (EO)₄ | 0.51 | 60 | 57.1 |
| 20 | Na | .51 | .48 | 1.02 | (EO)₆ | .57 | 60 | 62.2 |
| 21 | K | .53 | .46 | 1.08 | | 0 | 25 | 2.9 |
| 22 | K | .53 | .49 | 1.09 | (EO)₄ | .55 | 25 | 3.0 |
| 23 | K | .52 | .48 | 1.07 | (EO)₆ | .57 | 25 | 11.4 |

In a third series of experiments, cyclic tetramer of ethylene oxide was used to accelerate the reaction of ethylene oxide with butanol catalyzed by sodium butoxide.

To a 0.138 molar solution of sodium n-butoxide in n-butanol was added sufficient ethylene oxide to provide a concentration of about 0.5 molar of the oxide. To aliquot portions of this mixture, various amounts of the cyclic tetramer of ethylene oxide were added. All the mixtures, in closed vials, were then placed in a bath at 50° C. Periodically, samples were withdrawn and analyzed for ethylene oxide. From these analyses, the rate constant based on disappearance of ethylene oxide was calculated. This constant, $k$, is compared with the constant, $k_o$, obtained in the absence of the cyclic tetramer. The data are summarized in Table IV. In the table the concentration of the tetramer is expressed as moles per mole of sodium butoxide.

TABLE IV

| Example | Conc. Tetramer | $k/k_o$ |
|---|---|---|
| 24 | 0 | 1.00 |
| 25 | 0.41 | 1.60 |
| 26 | 1.12 | 2.82 |
| 27 | 10.20 | 3.47 |

TABLE II

[Effect of added cyclic polyether on rate of reaction of alkali metal alkoxides, MO(CH₂CH₂O)₃—CH₃, with alkylene oxides in diglyme as an inert solvent]

| Example | Alkoxide Cation | Conc., M. | Alkylene oxide Type | Conc., M. | Cyclic ether [a] Type | Conc., M. | Temp., °C. | Rate constant [b] |
|---|---|---|---|---|---|---|---|---|
| 1 | Li | 0.50 | EO | 0.45 | | 0 | 60 | 2.7 |
| 2 | Li | .51 | EO | .46 | (EO)₄ | 0.54 | 60 | 3.1 |
| 3 | Na | .53 | EO | .49 | | 0 | 60 | 6.5 |
| 4 | Na | .57 | EO | .54 | (EO)₄ | .61 | 60 | 8.1 |
| 5 | Na | .49 | EO | .45 | (EO)₆ | .50 | 60 | 12.1 |
| 6 | Na | .60 | EO | .60 | | 0 | 60 | 6.3 |
| 7 | Na | .48 | EO | .60 | (PO)₅ | .46 | 60 | 11.9 |
| 8 | Na | .60 | EO | .60 | (CPO)₄ | .64 | 60 | 8.7 |
| 9 | Na | .60 | EO | .60 | Dibenzo-18-crown-6 | .64 | 60 | 7.5 |
| 10 | Na | .60 | EO | .60 | Dicyclohex-18-crown-6 | .64 | 60 | 14.7 |
| 11 | K | .52 | EO | .51 | | 0 | 25 | 31.4 |
| 12 | K | .51 | EO | .47 | (EO)₄ | .58 | 25 | 38.5 |
| 13 | K | .51 | EO | .48 | (EO)₆ | .59 | 25 | >900 |
| 14 | K | .60 | EO | .60 | | 0 | 25 | 29.7 |
| 15 | K | .60 | EO | .60 | Dicyclohex-18-crown-6 | .64 | 25 | 600 |
| 16 | K | .49 | PO | .49 | | 0 | 60 | 12 |
| 17 | K | .49 | PO | .50 | (EO)₆ | .49 | 60 | >2,000 |

[a] (EO)₄ and (EO)₆ are cyclic tetramer and hexamer of EO, respectively; (PO)₅ is cyclic pentamer of PO; (CPO)₄ is cyclopentane oxide cyclic tetramer; dibenzo-18-crown-6 is

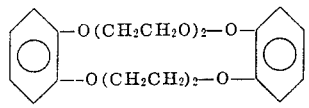 and dicyclohex-18-crown-6 is the analogous dicyclohexano derivative.

[b] Second order rate constant, 10³kM⁻¹Min⁻¹, defined by $d[EO]/dt = -k[EO][alkoxide]$.

In a final series of experiments, the effect of cyclic polyethers on the rate of reaction of EO with n-butanol, alkali metal hydroxide being the catalyst, was studied. Results are shown in Table V.

ducting the reaction in the presence of a cyclic polyether having the formula

TABLE V

| Example | Catalyst Type | Catalyst Conc., M. | EO conc., M. | Cyclic polyether Type [a] | Cyclic polyether Conc., M. | Temp., °C. | Rate const.[b] |
|---|---|---|---|---|---|---|---|
| 28 | LiOH·H₂O | 0.0156 | 2 |  | 0 | 100 | 1,440 |
| 29 | LiOH·H₂O | 0.0156 | 2 | (EO)₄ | 0.17 | 100 | 1,540 |
| 30 | LiOH·H₂O | 0.0156 | 2 | (EO)₄ | .255 | 100 | 2,340 |
| 31 | NaOH | .14 | 2.2 |  | 0 | 60 | 164 |
| 32 | NaOH | .14 | 2.2 | (PO)₅ | .17 | 60 | 471 |
| 33 | NaOH | .14 | 2.2 | Dicyclohex-18-crown-6 | .17 | 60 | 593 |
| 34 | NaOH | .0155 | 2 |  | 0 | 100 | 1,740 |
| 35 | NaOH | .0155 | 2 | (EO)₄ | .072 | 100 | 3,180 |
| 36 | NaOH | .0155 | 2 | (EO)₄ | .312 | 100 | 13,500 |
| 37 | NaOH | .0155 | 2 | (EO)₆ | .0106 | 100 | 8,130 |
| 38 | NaOH | .0155 | 2 | (EO)₆ | .193 | 100 | 23,200 |
| 39 | NaOH | .0155 | 2 | (PO)₄ | .308 |  | 1,820 |
| 40 | KOH | .13 | 2.2 |  | 0 | 60 | 123 |
| 41 | KOH | .13 | 2.2 | (PO)₅ | .13 | 60 | 277 |
| 42 | KOH | .13 | 2.2 | Dicyclohex-18-crown-6 | .13 | 60 | 538 |
| 43 | KOH | .0156 | 2 |  | 0 | 100 | 1,860 |
| 44 | KOH | .0156 | 2 | (EO)₄ | .052 | 100 | 2,860 |
| 45 | KOH | .0156 | 2 | (EO)₄ | .307 | 100 | 6,040 |

[a] For identity of polyethers see footnote (a), Table II.
[b] Second order rate constant, 10³kM.⁻¹ min.⁻¹, defined by d[EO]/dt=−k[EO][alkoxide].

As is evident from the above examples, the maximum effect of the polyether is obtained when the alkali metal cation is matched with an ether of appropriate ring size. Thus, Li⁺ and Na⁺ are highly activated by tetraethers whereas K⁺ is much less so but is strongly activated by penta- and hexa-ethers. For the preferred cations, Na⁺ and K⁺, the most effective ethers are those having 4–6 ether groups in the ring, especially the polymers of unsubstituted EO.

While we have described the invention in terms of carrying out the process "in the presence of" cyclic polyethers, it is known that the alkali metal cations form complexes in situ with these ethers. Accordingly, such complexes can be prepared separately and then added to the reaction mixture, and such variant is intended to be included by the language "in the presence of" the ether.

We claim:

1. In the process wherein the reaction of an unsubstituted vicinal alkylene oxide with an active hydrogen compound which is an alkanol, alkenol, alkylene glycol, polyalkylene glycol, monoether of such glycol or polyglycol, glycerol, pentaerythritol or sorbitol is catalyzed by an alkali metal base, the improvement of conducting the reaction in the presence of a cyclic polyether having the formula

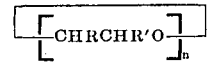

wherein each R and R', taken separately, is H, phenyl or alkyl of up to eight carbon atoms, or, in any or all of the n units, may be joined together to form a benzene or cycloalkane ring of 5 to 6 members, and n is an integer 4 to 10, the molar ratio of said ether to alkali metal base being 0.1:1.0 to 10:1.

2. The process of claim 1 wherein R' is H, R is H or lower alkyl and n is 4–6.

3. The process of claim 1 wherein 0.1 to 10 moles of the polyether per mole of catalyst is used.

4. The process of claim 1 wherein the alkylene oxide is ethylene or propylene oxide.

5. The process of claim 1 wherein the alkali metal is Na or K.

6. The process of claim 5 wherein R and R' are H and n is 4–6.

7. The process of claim 1 wherein the active hydrogen compound is the methyl monoether of triethylene glycol, the alkylene oxide is ethylene oxide or propylene oxide and the molar ratio of cyclic polyether to alkali metal base is 0.1:1.0 to 10:1.

* * * * *